United States Patent [19]

Baldwin

[11] Patent Number: 4,769,246

[45] Date of Patent: * Sep. 6, 1988

[54] DYED COLLAGEN SAUSAGE CASING

[75] Inventor: William L. Baldwin, Bridgewater, N.J.

[73] Assignee: Devro, Inc., Somerville, N.J.

[*] Notice: The portion of the term of this patent subsequent to Mar. 1, 2005 has been disclaimed.

[21] Appl. No.: 115,954

[22] Filed: Nov. 2, 1987

Related U.S. Application Data

[62] Division of Ser. No. 848,667, Apr. 4, 1986, Pat. No. 4,728,523.

[51] Int. Cl.$^4$ ............................................. A22C 13/00
[52] U.S. Cl. ..................................... 426/140; 426/540
[58] Field of Search ............... 426/140, 250, 262, 277, 426/278, 540, 641, 646

[56] References Cited

U.S. PATENT DOCUMENTS

| | | | |
|---|---|---|---|
| 3,860,728 | 1/1975 | Tanner et al. | 426/140 X |
| 4,038,438 | 7/1977 | Rahman et al. | 426/278 X |
| 4,335,153 | 6/1982 | Rikon et al. | 426/540 |

Primary Examiner—Arthur L. Corbin
Attorney, Agent, or Firm—Michael Q. Tatlow

[57] ABSTRACT

A dye containing chocolate is added to a collagen casing material to produce a dyed collagen casing.

4 Claims, No Drawings

DYED COLLAGEN SAUSAGE CASING

This application is a division of U.S. Application Ser. No. 848,667, filed Apr. 4, 1986, now U.S. Pat. No. 4,728,523.

FIELD OF THE INVENTION

The present invention relates to edible collagen sausage casings, particularly to casings which are dyed with an edible dyestuff, and to a Process for manufacturing such casings.

BACKGROUND OF THE INVENTION

Edible collagen sausage casings are made with collagen which is derived from bovine hides or tendons. Such casings are widely used in the manufacture of many different sausage products including dried, smoked sausage. Dried, smoked sausage is widely available in various types such as beef sticks, pepperoni, salami, thuringer and summer sausage. These sausages are usually filled in an edible food casing of animal origin such as collagen. When the sausages are subject to the smoking process, the casing will pick up the color of the smoke. Unfortunately, the smoke will not uniformly color the casing, and therefore, there is a certain amount of nonuniformity of the casing which leads to an asthetically unacceptable product. It is preferred to employ a dyed casing in the manufacture of this type of product. The dye imparts a uniform color to the finished product and also prevents subsequent discoloration in the event of rehydration of the casing which is a common problem with undyed collage casings.

Prior art techniques for dyeing collagen casings have employed edible carriers in order to fix the dyestuff in the casing. For example, the process of U.S. Pat. No. 4,061,786 applies an edible dye to an edible carrier such as cellulose or starch powder, and then incorporates the powder into the extrudable gel and extrudes the resulting admixture to form the dyed casing.

The process U.S. Pat. No. 3,961,085 employs an encapsulating agent to encapsulate the powder of the dyestuff and then introduces the encapsulated dye into the extrusion gel and then extrudes the gel into a casing.

Other methods of incorporating the dye include coating an extruded casing with the dye and fixing the dye on the surface of the casing with heat.

The above-mentioned processes were particularly useful when dyeing the casing a reddish color as there are suitable food-grade red dyes available such as Annato or Bixin.

However, these dyes are not applicable if it is desired to dye the casing a brownish color or a mahogany color. The mahogany color can be characterized as brown with a trace of red. There are very few food-grade brown dyestuffs available which can be used in edible food products.

SUMMARY OF THE INVENTION

Applicants have discovered that it is possible to produce a brown colored or dyed, edible collagen casing by the use of chocolate as the dyestuff. Chocolate is a naturally-occurring material which is edible and when used in the present product and process does not impart any flavor to the collagen casing, but imparts an adequate brown color so the casing may be used for the purposes mentioned above. The chocolate in the casing will not be leached from the casing by water.

In addition, it is also possible to add other dyestuffs to the casing to provide a mahogany color or hue to the casing.

DETAILED DESCRIPTION OF THE INVENTION

The collage casings which can be dyed according to the present process are the well-known collagen sausage casings that are used in the production of edible sausages. Examples of such processes can be found in U.S. Pat. Nos. 3,446,633; 3,123,482; and 3,535,125. The collagen containing extrudable gels are generally prepared in the manner taught in the above-mentioned patents, and the chocolate dye may be applied to the casing by a number of different techniques. The chocolate may be incorporated into the extrudable gel when the extrudable gel is made. The gel can then be extruded in the normal fashion and processed through the normal manufacturing steps with no additional step necessary to fix the dye in the casing.

The dye may also be prepared and injected into the extrudable gel immediately prior to the point where the gel is extruded. If a mixer is employed between the point of injection of the dye into the extrudable gel and the point where the gel is actually extruded, there will be sufficient distribution of the dye throughout the gel to result in a uniform color in the casing.

The dye may also be applied to the casing after the casing is extruded and before or after the casing is dried but before the casing is shirred. The dye can be applied to the casing between the final washing step in the manufacture of the casing and the drying step. The dye can be sprayed on to the exterior surface of the casing or wiped on the surface of the washed casing with a wiper and the casing is then dried in the normal manner. The dye can be applied to the dried casing in a similar manner before the casing is shirred. The preferred process of incorporating the dye into the casing is to mix the dye into the collagen gel when the gel is being prepared.

The amount of chocolate in the finished casing may vary depending upon the depth of dyeing that is desired in the casing. Generally, the level of dye in the casing is between 1 and 15 percent based on the weight of the collagen solids in the casing. The preferred level of chocolate is between 5 and 10% chocolate. The chocolate used in the dye may be a commercially available chocolate liquor such as Peters #32, available from Nestles Food Corporation, or broken orinoco chocolate which are readily available materials. These materials are solids which must be liquified to incorporate the chocolate into the extrudable collagen gel. The chocolate can be melted in a heated vegetable oil such as corn oil, at a temperature of from about 150° to 160° F. to liquify the chocolate. It should be understood that other dyes may be added to the casing to produce brown casing with different hues. The other dyes should also be food approved dyes. Yellow, orange and red dyes, in amounts of about 1%, or less, added to the chocolate dye will provide brown casing with various hues. For example, if the casing is to have a reddish hue, oleoresin of paprika, an Annato dye, carmine or other FDA approved food coloring dye such as FD&C Red No. 3 in the pure form or in the form of a Lake may be used. The amount of the oleoresin of paprika employed would be between 0.5 to 1%, preferably about 0.6% based on the weight of dry collagen solids. The amount of the Annato, carmine or red dye would be 0.1 to 0.3%, Preferably 0.2% based on the weight of collagen solids. The reddish dye or dyes are first added to the hot corn oil and dispersed using a high shear mixer. Broken orinoco is then added to the warm corn oil mixture until the chocolate melts. This liquid material is used as a dye to dye the casing using any of the procedures which are set forth above.

The brown dye is uniformly distributed throughout the casing and will not leach out of the casing during the normal sausage manufacturing process or in the cooking of the sausage.

EXAMPLE 1

Hide Preparation

Hides from freshly slaughtered animals are trimmed and sided. They are washed and soaked overnight in city water at 16° C. The following day the hides are fleshed and weighed.

To a paddle vat with a capacity of 1100 gallons is added 3300 kilograms (kgs) of water and 1270 kgs of the fleshed hide. Forty-four and one-half kgs of hydrated lime and 32 kgs of sodium sulfide are added to the vat and the paddle is alternately run and stopped over a 15-hour per are then split on a leather-splitting machine to recover the corium layer of the hide.

The corium layer is further processed to prepare the collagen for extrusion. A large wooden drum (capacity are then split on a leather-splitting machine to recover the corium layer of the hide.

The corium layer is further processed to prepare the collagen for extrusion. A large wooden drum (capacity 3590 gallons) is charged with 2600 kgs of hide corium, prepared as described above, and 1110 gallons of water. The hide is washed with water in the drum for 30 minutes at a flow rate of 150 liters per minute. The wash is drained from the hide corium, and the washed corium is treated in the drum with 1110 gallons of water containing 13 kgs of ammonium sulfate for 2 hours, drained, and refilled with the ammonium sulfate solution. After turning the hide an additional 2 hours, the drum is drained and hide corium is washed with water for 3 hours at a flow rate of 150 liters per minute. The water is again drained from the hide corium, and the washed corium is treated in the drum with 1110 gallons of water containing 18 kgs of hydrous citric acid and 24.5 kgs of sodium citrate dihydrate. The drum is rotated for 16 hours with hourly adjustment of solution pH to maintain a solution pH of 4.6. At the end of this 16-hour treatment period, the citrate solution is drained, and the hides are washed for 4 hours in running water at a flow rate of 150 liters per minute. The hides are then shredded and ground to a particle size of approximately one-fourth inch. The ground quarter-inch wide particles will hereinafter be referred to as "¼ grind".

EXAMPLE 2

Dye Preparation 3.24 Kgs of corn oil are weighed into a stainless steel beaker and heated to 150°. 104 Grams of oleoresin of Paprika are stirred into the corn oil. 40 Grams of carmine powder are then added to the corn oil/paprika mixture. The combined ingredients are then mixed with a high shear mixer for 30 seconds to break up the lumps of carmine powder. 2.16 Kgs of broken orinoco are then stirred into the warm corn oil mixture. As the chocolate melts, the temperature of the resulting mixture drops to about 85° to 90° F. and the dye is now ready to be added to the extrusion gel.

EXAMPLE 3

40 Kgs of chipped ice and 331.72 liters of chilled water are put into a dispersion tank. 2.20 Kgs of powdered cellulose is added, and a mixer is turned on at maximum speed. After 10 minutes, 72 kgs of the ¼ grind of Example 1 are added. The mixer is run at maximum speed for approximately 20 minutes to break up the ¼ grind lumps and soften the ¼ grind. With the mixer running, the dye mixture of Example 2 is slowly poured into the dispersion at the area in the mixer of maximum turbulence to prevent lumps of dye from forming. The dye is mixed with the dispersion for approximately 10 minutes. With the mixer off, 4.08 kgs of hydrochloric acid (30%) are added. The mixer is again run at maximum speed for 40 minutes.

The dispersion containing the dye is then passed through a high speed cutting mill where the hide particles are shredded to form a hydrated mass of fibrous character. The mixture is then pumped through a dairy homogenizer, homogenized and transferred into a holding tank and deaerated until use. Immediately prior to use, the dye gel is again pumped through a dairy homogenizer and deaerated prior to extrusion. The gel is filtered and extruded into a collagen casing. The extrusion and subsequent processing are carried out by the process described in U.S. Pat. No. 3,535,125. The casing had a mahogany color which was uniform throughout the casing.

EXAMPLE 4

A series of samples of casing were prepared using the procedure set forth in Example 3. The percent of chocolate in the dye formulation was varied and the dye contained 0%, 1%, 5% and 10% chocolate. The color of the casing was measured using a MINOLTA Chroma Meter CR-100 and a MINOLTA Data Processor DP-100. The meter and the processor measure color in different modes; the Yxy, L*a*b* and L*C*H°. The dye formulation contained (percentages based on collagen solids).

15% corn oil
0.65% oleoresin of paprika
0.20% FD&C Red No. 3
varied Chocolate

The results are shown in the following table.

EXAMPLE 5

A casing was prepared as in Example 3. The dye formulation contained only 10% chocolate and 15% corn oil but not other dye. The casing color was measured as in Example 4. The casing had the following color values:

| Y | x | y | L* | a* | b* | L | C | H° |
|---|---|---|----|----|----|----|----|----|
| 61.17 | .3383 | .3388 | 82.46 | 2.54 | 11.74 | 82.5 | 12.01 | 77.9 |

EXAMPLE 6

As an indication of the color of the dyed casing of the present invention, the color of various commonly available items and the color of the various casings were compared using the Minolta Color Meter as in Example 4. The casing samples were those from Examples 4 which also contained chocolate, oleoresin of paprika and FD&C Red No. 3 and Example 5 which contained only chocolate. The results, using the LCH° scale are shown in the following table:

TABLE I

| % Choclate | Yxy | | | L*a*b* | | | LCH° | | |
|---|---|---|---|---|---|---|---|---|---|
| | Y | x | y | L | a | B | L | C | H |
| 0% | 50.72 | .3939 | .3186 | 76.50 | +31.95 | +13.74 | 76.50 | 34.77 | 23.2 |
| 1% | 59.27 | .3804 | .3384 | 80.33 | +19.32 | +18.42 | 80.33 | 26.49 | 43.6 |
| 5% | 59.27 | .3703 | .3540 | 81.68 | +9.13 | +21.88 | 81.68 | 23.70 | 67.4 |
| 10% | 56.62 | .3709 | .3571 | 79.96 | +7.98 | +22.58 | 79.96 | 23.94 | 70.6 |

| | L | C | H° |
|---|---|---|---|
| White undyed casing | 94.0 | 5.3 | 94.4 |
| Manilla folder | 90.5 | 23.3 | 88.6 |
| Light brown egg | 83.6 | 21.1 | 75.0 |
| 10% chocolate (1) | 82.5 | 12.01 | 77.9 |
| 5% chocolate dye (2) | 81.7 | 23.7 | 67.4 |
| 1% chocolate dye (2) | 80.3 | 26.5 | 43.6 |
| 10% chocolate dye (2) | 80.0 | 23.7 | 70.6 |
| 0% chocolate dye (2) | 76.5 | 34.8 | 23.2 |
| Medium brown egg | 70.7 | 31.5 | 63.6 |
| Dark brown egg | 61.3 | 36.8 | 58.5 |
| Kraft paper bag | 59.8 | 21.4 | 72.3 |
| Milk chocolate bag | 40.7 | 7.3 | 42.7 |
| Dark chocolate bar | 36.9 | 4.1 | 29.7 |

(1) From Example 5
(2) From Example 4

I claim:

1. An unfilled edible food casing suitable for use as casing for sausage comprising an edible collagen casing material containing a dye comprising from 1 to 15% by weight, based on the weight of the collagen, of chocolate.

2. The casing of claim 1 containing 5 to 10% be weight of chocolate.

3. The casing of claim 1 in which the dye also contains, based on the weight of collagen solids, from 0.5 to 1% of an Annato dye and between 0.1 and 0.3% of carmine.

4. The casing of claim 1 in which the dye also contains from 0.5 to 1% Annato and between 0.1 and 0.3% of an FD&C Red Dye #3.

* * * * *